United States Patent
Hohmann et al.

[19]

[11] Patent Number: 5,822,215

[45] Date of Patent: Oct. 13, 1998

[54] PUBLIC ON-LINE COMPUTER TERMINAL WITH PLIANT CURRENCY ACCEPTOR

[76] Inventors: Kurt D. Hohmann, 403 Elm St.; Christopher M. Smolen, 1915 N. James St., both of Rome, N.Y. 13440; David M. Lovy, 2778 Mill St., Blossvale, N.Y. 13308

[21] Appl. No.: 701,766

[22] Filed: Aug. 26, 1996

[51] Int. Cl.$^6$ .............................. G06F 17/00; G06F 7/00
[52] U.S. Cl. .............................. 364/479.01; 364/479.02; 364/479.05; 364/479.07; 340/825.55
[58] Field of Search ............... 364/479.02, 479.01, 364/479.05, 479.07; 340/825.55; 235/381; 194/241

[56] References Cited

U.S. PATENT DOCUMENTS

| | | | |
|---|---|---|---|
| 3,681,755 | 8/1972 | Stone et al. | 340/172.5 |
| 3,938,093 | 2/1976 | Riess | 340/152 |
| 4,370,649 | 1/1983 | Fuerle | 340/825.35 |
| 4,477,695 | 10/1984 | Buck | 178/3 |
| 4,566,033 | 1/1986 | Riedenouer | 358/115 |
| 4,777,469 | 10/1988 | Engelke et al. | 379/96 |
| 4,783,798 | 11/1988 | Leibholz et al. | 380/23 |
| 4,897,868 | 1/1990 | Engelke et al. | 379/96 |
| 4,926,997 | 5/1990 | Parker | 194/231 |
| 5,008,928 | 4/1991 | Cleghborn | 379/100 |
| 5,025,373 | 6/1991 | Keyser et al. | 364/408 |
| 5,113,396 | 5/1992 | Kagami | 370/110.2 |
| 5,198,806 | 3/1993 | Lord | 340/825.31 |
| 5,240,098 | 8/1993 | Desai | 194/219 |
| 5,393,964 | 2/1995 | Hamilton et al. | 235/381 |
| 5,426,692 | 6/1995 | Fujise | 379/93 |
| 5,485,370 | 1/1996 | Moss et al. | 364/408 |
| 5,572,005 | 11/1996 | Hamilton et al. | 235/381 |
| 5,577,105 | 11/1996 | Baum et al. | 379/93 |

*Primary Examiner*—Reba I. Elmore
*Assistant Examiner*—Ramesh Patel
*Attorney, Agent, or Firm*—Robert O. Wright

[57] ABSTRACT

A public on-line computer terminal providing the general public a variety of on-line services over the global telecommunications network for a fee is controlled by a pliant currency acceptor that activates a timing function. The public user is provided through public telecommunications channels and interface equipment access to the global telecommunications network for a predetermined amount of time in accordance with the currency inserted in the pliant currency acceptor.

17 Claims, 4 Drawing Sheets

PUBLIC ON-LINE COMPUTER TERMINAL WITH PLIANT CURRENCY ACCEPTOR

This invention relates to public on-line computer terminals and more particularly to a method and apparatus for providing on-line global telecommunications network access for a fee.

BACKGROUND OF THE INVENTION

Several attempts have been made in recent years to bring computing equipment into the public arena, but the problem of charging the public for on-line global telecommunications network access time has limited public acceptance. Some locations rely on an honor system, which often leads to less than honest reporting of time. If it is left up to staff personnel to monitor the time, the system quickly breaks down if that staff person must also perform other duties. Finally, some have used the method of attaching a credit card swipe machine, such as those found on gas pumps. Unfortunately, this assumes that the user has a credit card and is willing to trust it to an open machine. Still others use an electrical coin operated accumulator, such as shown in U.S. Pat. No. 5,240,098 to Desai, to enable use of a personal computer in a public venue. Coin operated accumulators are limited, however in the amount of money that can be easily inserted to pay for more extensive on-line services. While pliant currency acceptors are known for use with standard vending machines they are not readily adaptable for use with a digital computer terminal such as required for global telecommunications access.

On-line global telecommunications network access is becoming increasingly necessary. There are many disadvantaged populations in the United States for instance, that do not have access to on-line global telecommunications services. Generally this is due to the high cost of digital computer equipment and the complexities of configuring the machine.

OBJECTS AND SUMMARY OF INVENTION

The present invention provides on-line global telecommunications network access via a digital computer connected to a pliant currency acceptor both housed in a sturdy, tamper-resistant housing that can be effectively installed in public venues for direct public use. Suitable circuits and software are provided to convert the pliant currency acceptor output into a digital computer input that can be recognized at one of its serial ports which enables the user to obtain global access for a predetermined amount of time.

It is therefore an object of the present invention to provide a public on-line computer terminal with a pliant currency acceptor together with suitable software and circuitry to permit a user on-line global telecommunications network access for a period of time determined by the amount of money inserted in the pliant currency acceptor.

It is another object of the present invention to provide a public on-line computer terminal with a pliant currency acceptor that is self-operating and does not require an attendant to offer the service.

It is another object of the present invention to provide a public on-line computer terminal with a pliant currency acceptor that is simple in design and construction, reliable in use, and economical to manufacture.

It is a still further object of the present invention to provide a public on-line computer terminal with a pliant currency acceptor that permits the driving mechanism of the computer terminal, including data storage, memory and display, to be operational at all times while enabling and disabling the network access in accordance with the amount of pliant currency inserted in the acceptor.

These and other and further objects of the present invention will become apparent from time to time throughout the specification and claims herein.

PREFERRED EMBODIMENT

Figure 1:
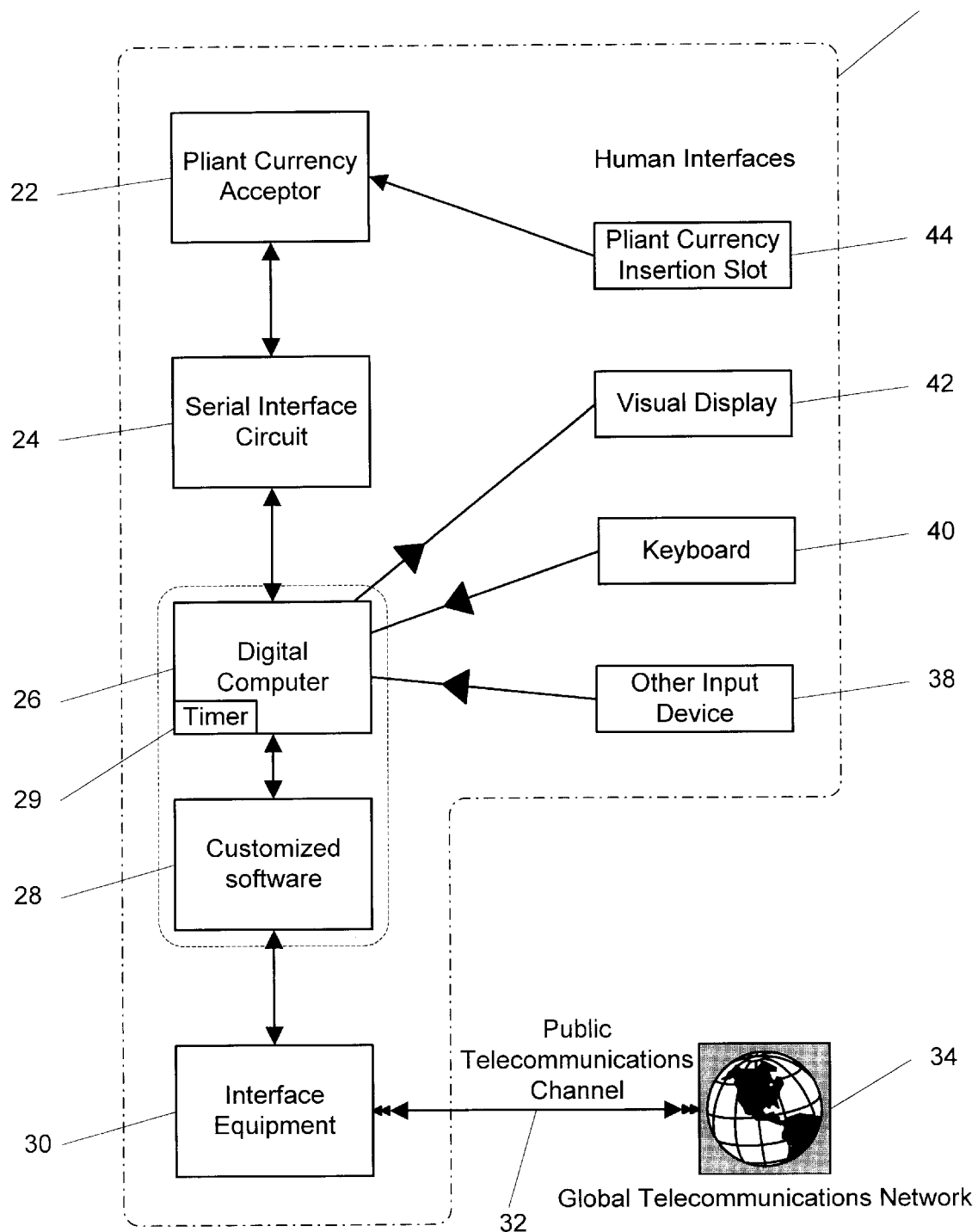
FIG. 1 is a block diagram of the basic components of a computer terminal according to the present invention.

Referring now to FIG. 1 there is shown in block diagram form the various components of a public on-line computer terminal 1 according to the present invention. A pliant currency acceptor 22 is connected through a serial interface circuit 24 to a digital computer 26. Also connected to computer 26 is a custom software package 28 and an interface equipment 30, which may take the form of a public telecommunications interface such as a modem. A display 42, which may take the form of the usual computer screen visual display, a keyboard 40, and other input devices 38 are also operatively connected to the digital computer 26. The other input devices illustratively shown at 38 may be a mouse, a video camera, a touch screen, etc. Typically input 38 will be a mouse.

Digital computer 26 has at least a hard drive for storing data, a display controller, memory, input and output ports and a central processing unit(CPU) as are well known in the art in addition to the foregoing components. The computer 26 also has an internal clock 29 which is monitored by the customized software to set the amount of on-line time available in accordance with signals received from the acceptor 22 indicating the amount of pliant currency inserted in the acceptor 22. Public on-line computer terminal 1 is connected to a public telecommunications channel 32 via interface equipment 30, which in turn is connected to a global telecommunications network 34. Digital computer 26 and pliant currency acceptor 22 are connected to a source of electrical power not shown.

In operation the driving mechanism of the digital computer 26 is operational all the time with access to the global telecommunications network being activated in accordance with a signal from the pliant currency acceptor 22. The pliant currency acceptor 22 sends a signal indicating the amount of money inserted therein to the digital computer 26 via the serial interface circuit 24 which converts the electrical signal produced by acceptor 22 into a new electrical signal that the digital computer 26 can recognize at one of its serial ports. The signal from acceptor 22 is usually a series of pulses which signify the amount of currency inserted therein. Software 28 recognizes the pulses received at the serial port from circuit 24, determines the amount of time actually paid for, and polls the internal clock 29 to set a reference point from which it monitors the passage of time until the set amount of time has elapsed. Software 28 also activates access to the global telecommunications network for the amount of time paid for. In addition to monitoring the clock 29, when time has nearly run out software 28 notifies the user by a flag or other indication at the display 42. It then checks the acceptor 22 for additional currency. If none has been inserted it disables the on-line access only.

Figure 2:
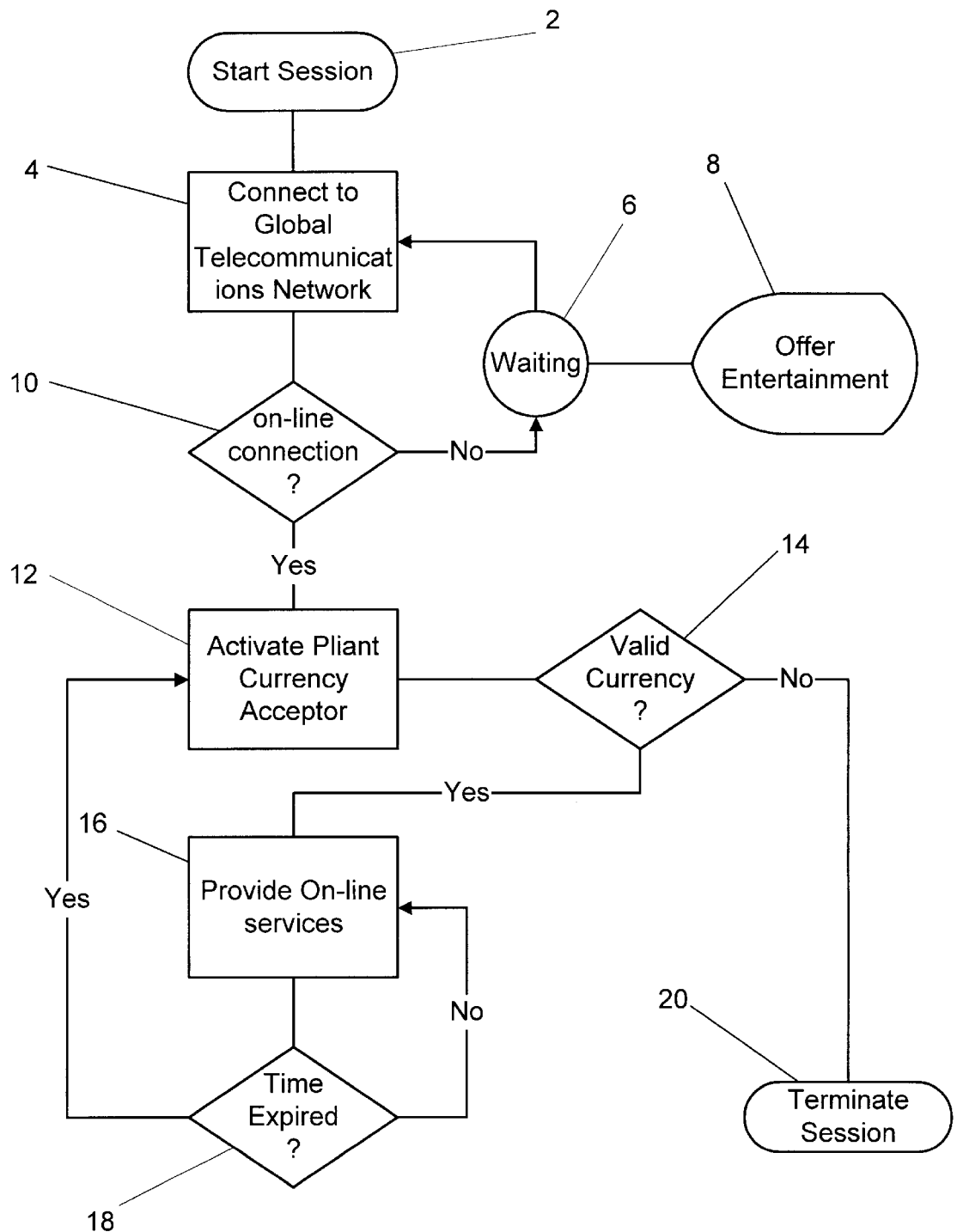
FIG. 2 is a process flow chart showing the basic sequential operational steps in a typical user session.

Referring now to FIG. 2 the usual sequence of operation when a user session is started is shown. A session is started on the public on-line computer terminal at 2 by pressing any key on the keyboard 40 which causes computer 26 together with software 28 and interface 30 to attempt a connection 4 to the global telecommunications network 34 via public telecommunications channel 32. If the on-line connection 10 is not granted the user must wait at 6 and is offered entertainment 8 while waiting. If the on-line connection is granted, the user is prompted to insert currency into the pliant currency acceptor as indicated at 12. The pliant currency acceptor 22 determines if the currency is valid as at 14. If the currency is valid on-line services are provided as at 16. If the currency is invalid the user session is terminated as indicated at 20. As indicated above the time purchased via the acceptor 22 is monitored and when expired the sequence is either continued if additional currency is inserted in a timely fashion or reinitiated when currency is in fact inserted in the pliant currency acceptor 22.

Figure 3:
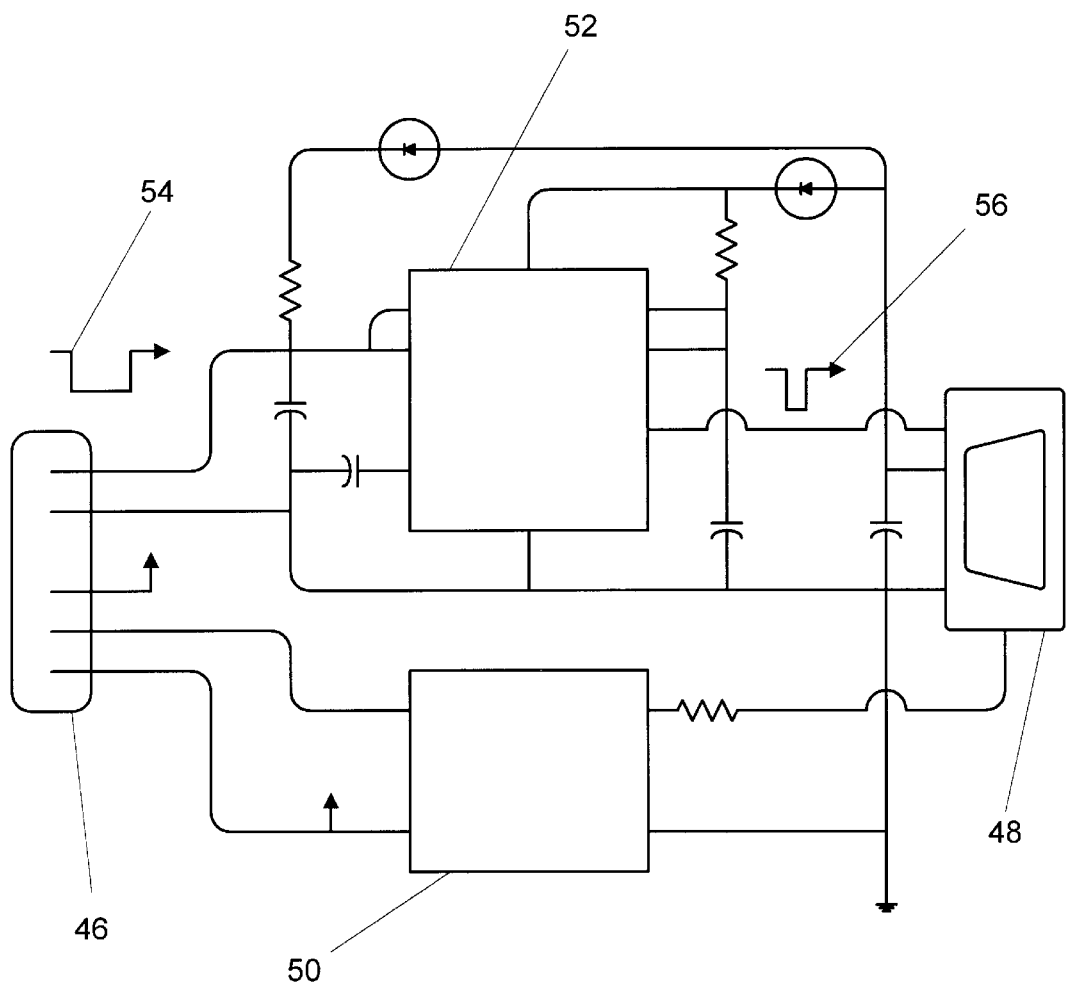
FIG. 3 is a schematic diagram of the serial interface circuit of the present invention.

Referring now to FIG. 3 serial interface circuit 24 converts the electrical pulses produced by the pliant currency acceptor 22 into a new shorter pulse that the digital computer 26 can interpret and recognize at its serial port. The circuit in FIG. 3 converts the wide pulse 54 from acceptor 22, to a narrow pulse 56 having the proper characteristics to be read and interpreted at serial port 48 of computer 26. A monostable multivibrator circuit 52 condenses pulse 54 into a shorter pulse, the width of which is determined by the RC value on the output of the circuit 52 as shown at 56. Triggering of the multivibrator 52 requires that the input pulse drop from its positive rest value (above $\frac{2}{3}$ Vcc) to a value lower than $\frac{1}{3}$ Vcc. An optical isolator 50 prevents any unwanted high voltage in the pliant currency acceptor from reaching the serial port 48 and computer 26.

Figure 4:
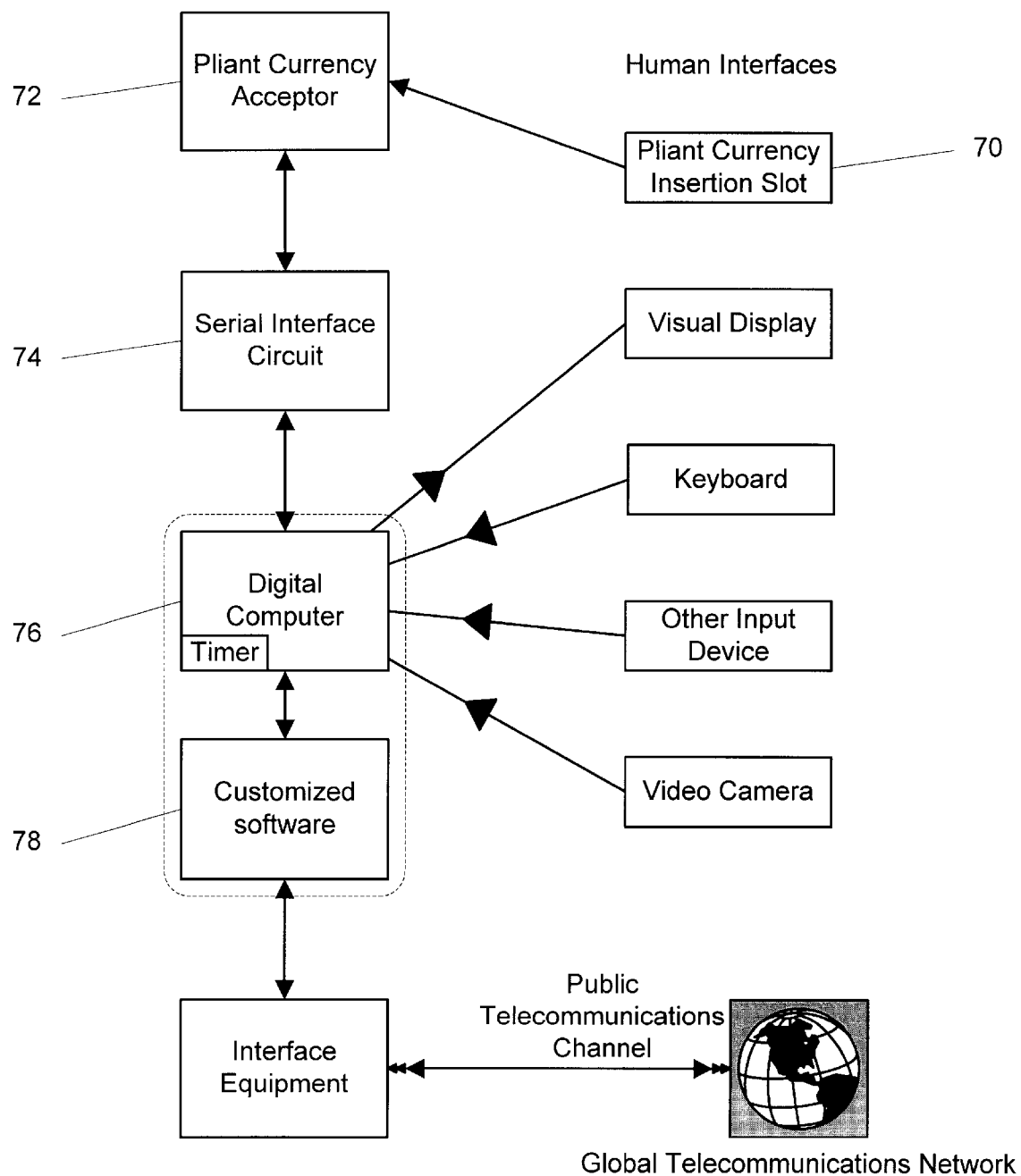
FIG. 4 is a view similar to FIG. 1 of another embodiment of the present invention.

Referring now to FIG. 4 there is shown another embodiment of the present invention. A pliant currency acceptor 72 has an insertion slot 70 and is connected to a serial interface circuit 74 which in turn is connected to a public digital computer terminal 76. Digital computer terminal 76 has at least a hard drive, display device, keyboard, memory, central processing unit, and input devices as are well known in the art. Customized software package 78 functions in similar manner to software package 28 to monitor inputs from acceptor 72 via circuit 74 to activate terminal 76 for a period of time proportional to the amount of currency inserted in acceptor 72. The user then can use the public digital computer terminal for the designated time. Similar warning flags are provided in the display and operation of the computer terminal is interrupted upon expiration of the paid time interval by the customized software package 78.

While there are given above certain specific examples of this invention and its application in practical use, it should be understood that they are not intended to be exhaustive or to be limiting of the invention. On the contrary, these illustrations and explanations herein are given in order to acquaint others skilled in the art with this invention and the principles thereof and a suitable manner of its application in practical use, so that others skilled in the art may be enabled to modify the invention and to adapt and apply it in numerous forms each as may be best suited to the requirement of a particular use.

We claim:

1. A fee activated public on-line computer terminal comprising in combination:

a digital computer having at least memory, CPU, display and input components;

a pliant currency acceptor having output pulses indicative of the amount of currency inserted therein;

a serial interface circuit connected between said digital computer and said pliant currency acceptor;

a public telecommunications interface connected to said digital computer and adapted to be connected to a public telecommunications channel;

a custom software package connected to said digital computer and said serial interface for controlling operation of said terminal;

said software package including;

means for connecting said digital computer to a global telecommunications network via said telecommunications interface and a public telecommunications channel, means for activating said pliant currency acceptor for reception and validation of currency inserted therein, means for determining the amount of pliant currency inserted in said pliant currency acceptor, means including an internal clock for setting a period of time proportional to the pliant currency inserted in said acceptor, means for activating and maintaining access (thereto) to said global telecommunications network for said (a) period of time proportional to the amount of pliant (fee paid by the) currency inserted in said pliant currency acceptor.

2. The invention as claimed in claim 1 wherein said circuit means includes an optically isolated controller operated by said digital computer to activate and deactivate said pliant currency acceptor.

3. The invention as claimed in claim 2 wherein said software package means causes said computer operated optically isolated controller to deactivate said pliant currency acceptor in the absence of an established global network connection.

4. The invention as claimed in claim 1 wherein said software package includes a program for:

displaying on said digital computer display the services available on said global network;

monitoring user selection of desired services; and executing a subroutine program to provide the user selected services.

5. The invention as claimed in claim 4 wherein said software package further includes:

means for monitoring said pliant currency acceptor for approaching lapse of paid time;

means for displaying a warning flag on said computer display to notify the user when paid time has nearly run out; and means for terminating access upon expiration of paid time without deactivating the rest of the computer terminal.

6. The method of making global telecommunications network access available for a fee which comprises:

providing a public digital computer terminal having at least memory, display and input components;

interfacing said computer terminal with a public telecommunications channel;

connecting a pliant currency acceptor with said digital computer terminal;

providing software for said digital computer terminal for accomplishing the following steps;

activating and maintaining operational the main driving mechanism of said digital computer terminal;

activating said pliant currency acceptor for the reception of currency;

polling the internal clock of said digital computer and setting a time period proportional to the amount of pliant currency inserted in said activated acceptor;

establishing access with a global telecommunications network from said computer terminal;

(activating a pliant currency acceptor for the reception of currency;)

maintaining said access for a period of time proportional to the amount of currency inserted in said pliant currency acceptor after establishment of said access; and terminating said access upon expiration of said period of time.

7. The method claimed in claim 6 further including checking the validity of the pliant currency inserted and terminating said access if said currency is invalid.

8. The method claimed in claim 6 wherein said step of establishing access includes providing entertainment to the user while waiting for an on-line connection to provide said access.

9. The method claimed in claim 6 further including displaying on said computer display a list of information and telecommunications services available to a user on said accessed global telecommunications network;

monitoring user selections from said list;

executing a subroutine program to allow user to use the selected information and services from said list over said established access with a global telecommunications network.

10. The method of claim 6 further including connecting a serial interface circuit between said computer terminal and said pliant currency acceptor; and causing said serial interface circuit to convert the output signal from said acceptor into a signal recognizable by said digital computer terminal.

11. The method of claim 10 further including providing an optically isolated controller within said serial interface circuit to allow said computer terminal to signal said pliant currency acceptor to activate and deactivate without direct electrical contact.

12. The method claimed in claim 6 wherein said maintaining access includes polling an internal clock in said digital computer terminal to set an operating time interval proportional to the currency received by said acceptor; and monitoring passage of said time interval to limit said access to the period of time paid for by a user.

13. A fee activated public digital computer terminal comprising in combination:

a digital computer having at least memory, CPU, display and input components;

a pliant currency acceptor having output pulses indicative of the amount of currency inserted therein;

a serial interface circuit connected between said digital computer and said pliant currency acceptor adapted to convert said acceptor pulses to a format readable by said digital computer;

a custom software package connected to said digital computer;

said software package including;

means for activating and maintaining operational the main driving mechanism of said digital computer, (and)

means for activating said pliant currency acceptor for reception and validation of pliant currency inserted therein;

means for polling the internal clock of said digital computer and setting a time period proportional to the amount of pliant currency inserted in said activated acceptor;

means for granting operational access to said digital computer for (a) said period of time;

means for terminating said access upon expiration of said set time period.

14. The invention as claimed in claim 13 wherein said circuit means includes an optically isolated controller operated by said digital computer to activate and deactivate said pliant currency acceptor.

15. The method of making a digital computer available for public use for a fee which comprises:

providing a public digital computer terminal having at least memory, display, CPU, and input components;

providing a pliant currency acceptor having an output of a series of pulses indicating the amount of currency accepted therein;

connecting (a) said pliant currency acceptor with said digital computer terminal;

providing a custom software package operatively connected to said digital computer;

providing a serial interface circuit to convert said series of pulses to digital computer readable format;

causing said serial interface circuit to convert the output signal from said acceptor into a signal recognizable by said digital computer terminal;

causing said digital computer to poll its internal clock and said signal from said interface circuit to establish a period of time of operation of said computer terminal proportional to the amount of pliant currency inserted in said acceptor;

activating operational access to said computer terminal for (a) said period of time; and terminating said access upon expiration of said established time period (proportional to the amount of currency inserted in said pliant currency acceptor).

16. Apparatus for making a digital computer terminal available for public use including access to global area networks such as the Internet for periods of time proportional to an amount of pliant currency inserted in a pliant currency acceptor which comprises in combination:

a pliant currency acceptor, having an output of a series of pulses indicating the amount of pliant currency accepted therein, adapted to be connected to a digital computer terminal;

a serial interface adapted to be connected to said pliant currency acceptor and a digital computer terminal to convert said series of pulses to computer readable format;

a custom software package adapted to be operatively connected to a digital computer terminal;

said software package including:
    means for activating said pliant currency acceptor to receive pliant currency therein;
    means for setting a period of time proportional to the pliant currency inserted in said acceptor;
    means for activating and maintaining operational the main driving mechanism of a digital computer terminal connected thereto; and
    means for activating and maintaining access to said global area network for said period of time proportional to the pliant currency inserted in said acceptor.

17. The method of making a digital computer terminal available to public use including operations over global area networks such as the Internet for a fee which comprises:

providing a pliant currency acceptor having an output of a series of pulsed indicating the amount of currency accepted therein;

providing a serial interface circuit adapted to connect said pliant currency acceptor with a digital computer terminal;

providing a custom software package adapted to be operatively connected to a digital computer terminal;

providing means to convert said acceptor series of pulses to computer readable format;

creating via said software package a period of operational time for a digital computer terminal, to which the acceptor and software are attached, proportional to the amount of pliant currency inserted in said acceptor;

providing via said software package access, for a digital computer terminal connected thereto, to said global area network;

providing via said software package operational access, to a digital computer terminal to which said software package is connected and to global area networks, for said period of time proportional to the currency inserted in said acceptor.

\* \* \* \* \*